No. 868,655. PATENTED OCT. 22, 1907.
R. H. GOLDSBOROUGH.
TURBINE.
APPLICATION FILED JAN. 29, 1907.
5 SHEETS—SHEET 1.
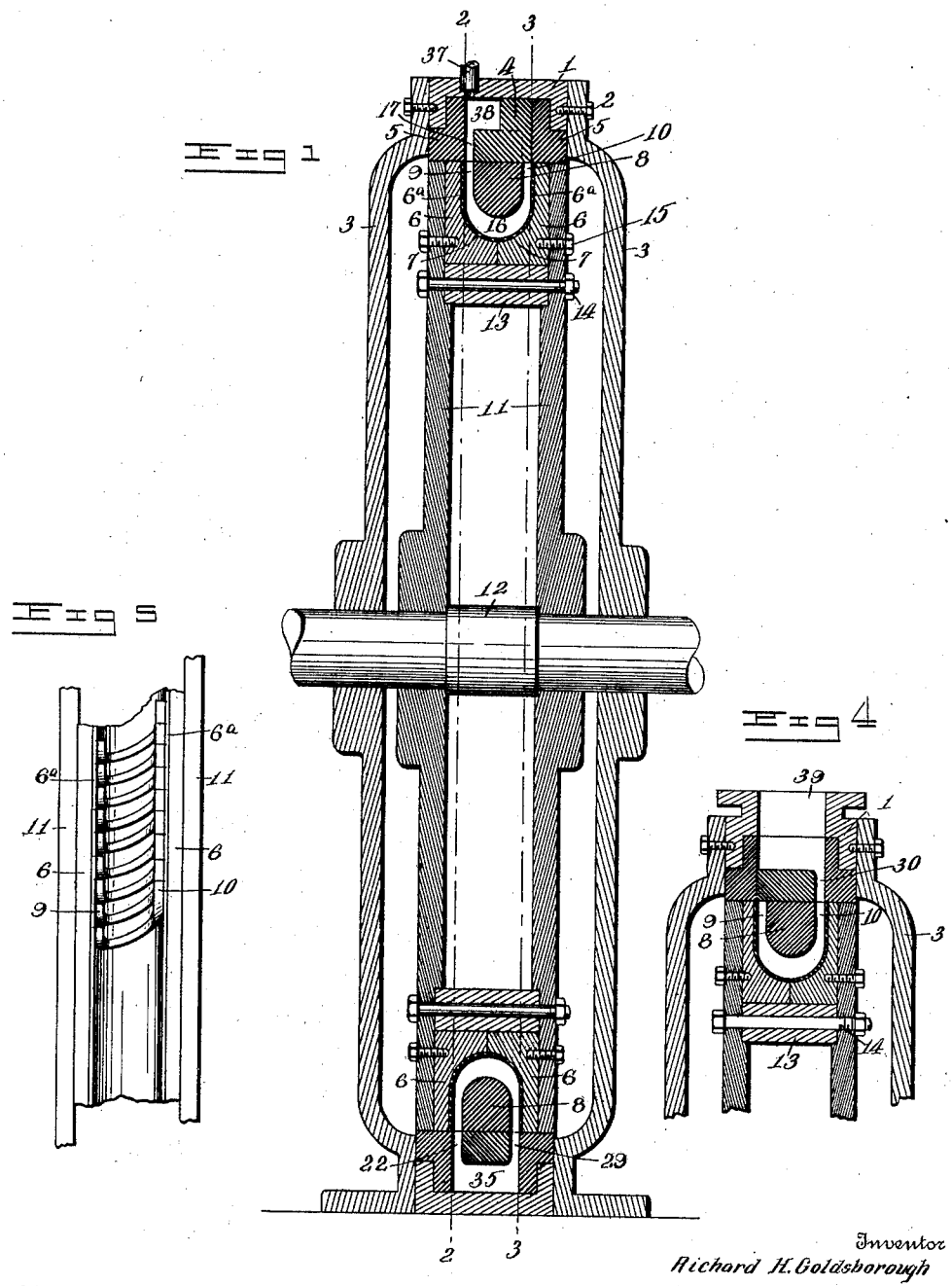
Witnesses
H. A. Robinette
L. A. Stanley
Inventor
Richard H. Goldsborough
By G. Ayres
Attorney No. 868,655.
PATENTED OCT. 22, 1907.
R. H. GOLDSBOROUGH.
TURBINE.
APPLICATION FILED JAN. 29, 1907.
5 SHEETS—SHEET 2.
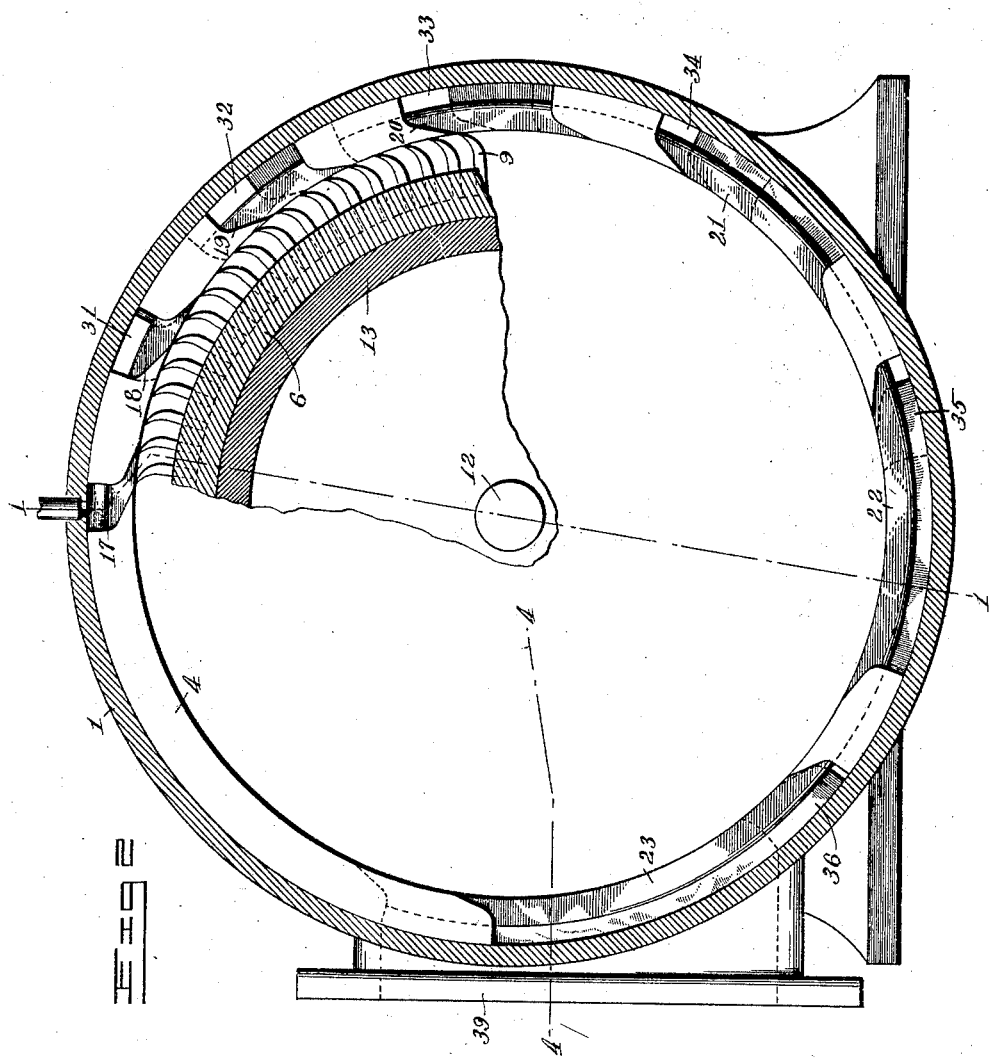
Witnesses
H. C. Robinette
L. A. Stanley
Inventor
Richard H. Goldsborough
By
G. Ayres
Attorney

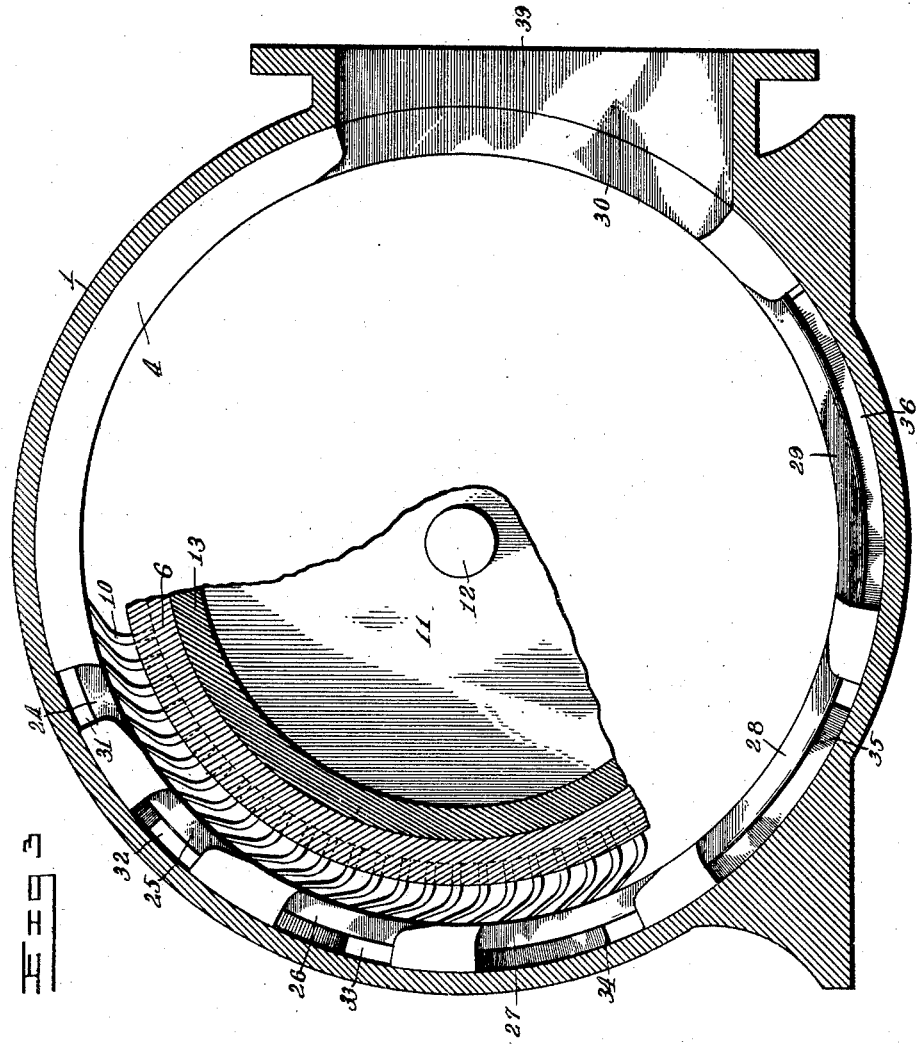

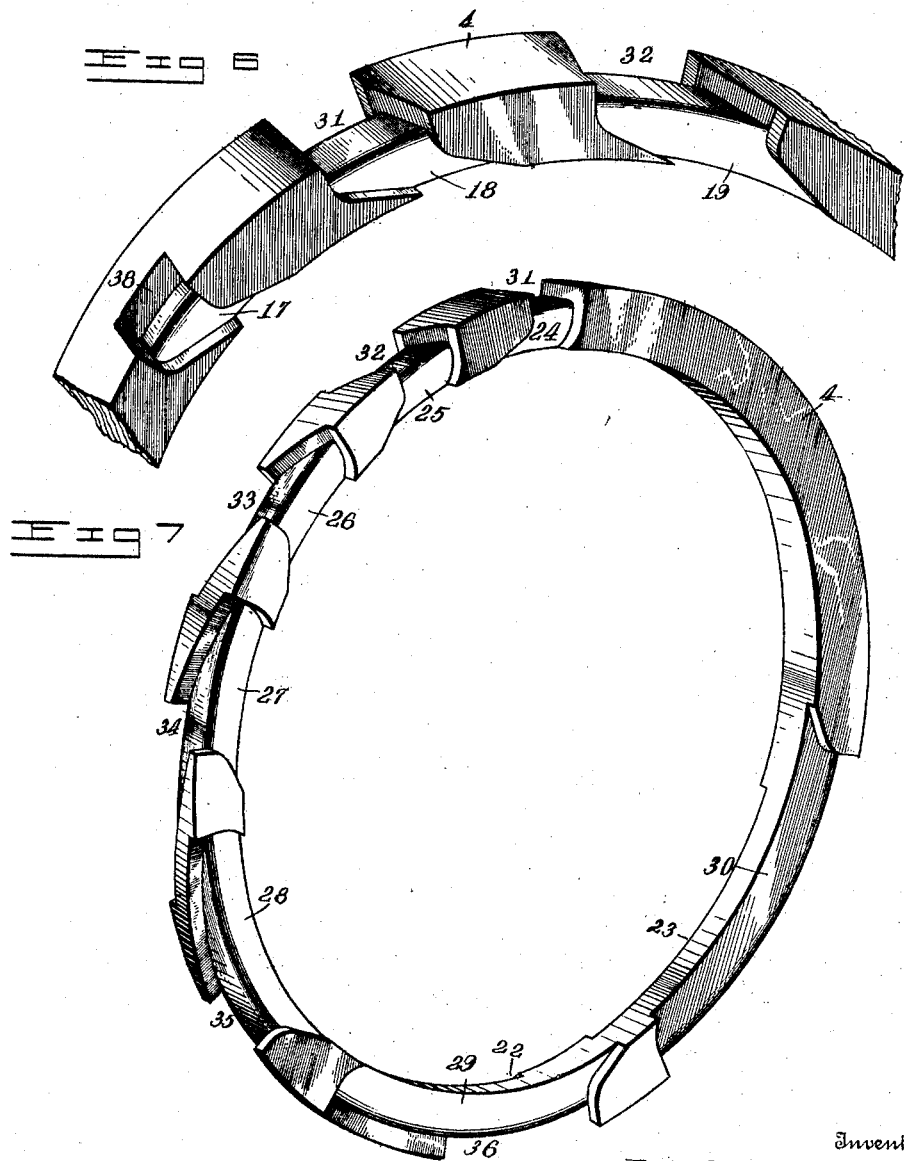

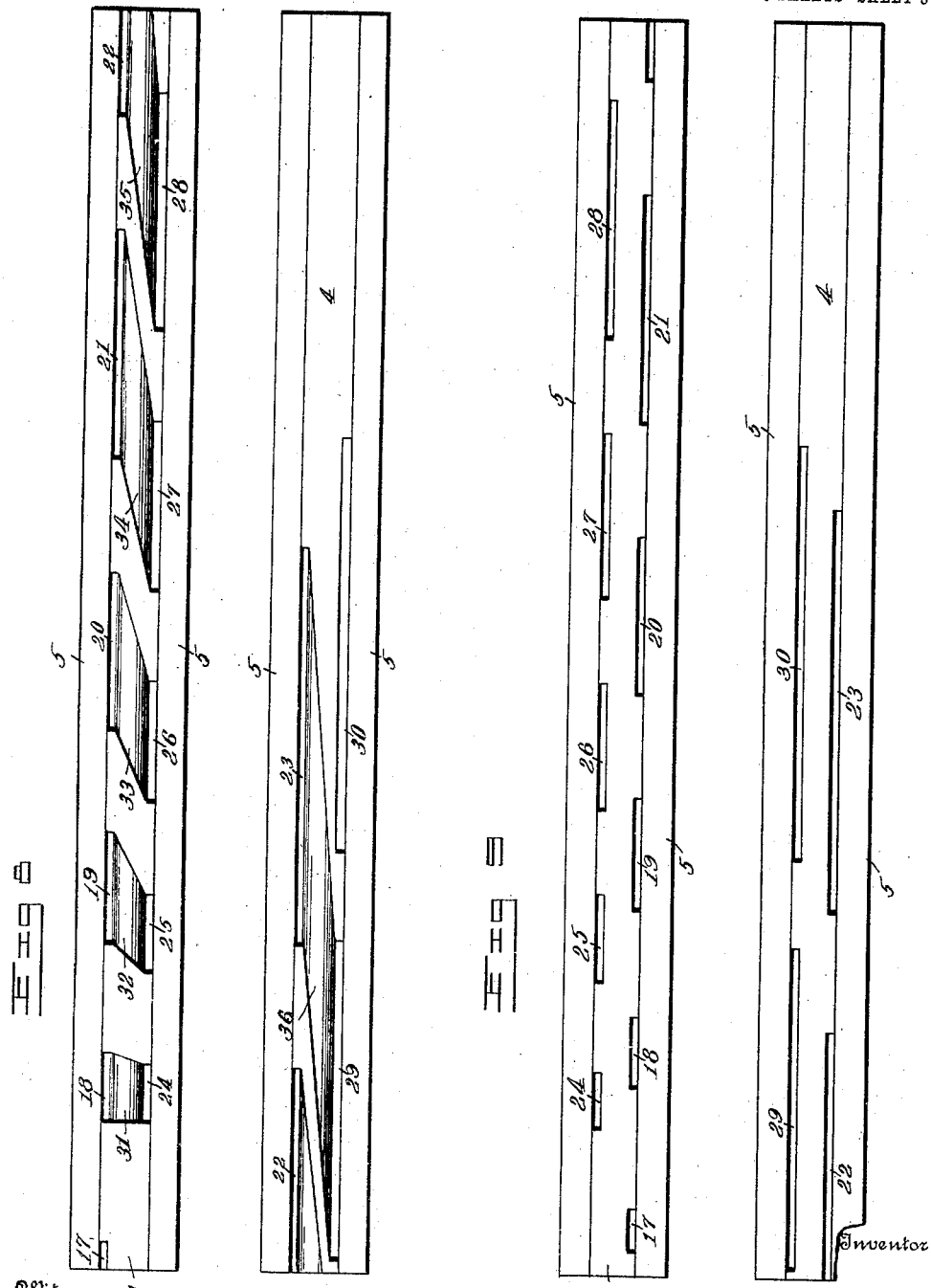

UNITED STATES PATENT OFFICE.

RICHARD H. GOLDSBOROUGH, OF WASHINGTON, DISTRICT OF COLUMBIA.

TURBINE.

No. 868,655.  Specification of Letters Patent.  Patented Oct. 22, 1907.

Application filed January 29, 1907. Serial No. 354,676.

To all whom it may concern:

Be it known that I, RICHARD H. GOLDSBOROUGH, a citizen of the United States, residing at Washington, District of Columbia, have invented certain new and useful Improvements in Turbines, of which the following is a specification.

My invention relates to improvements in turbines, and it consists in the constructions, combinations and arrangements herein described and claimed.

An object of my invention is to provide a simple and compact form of compound turbine, especially adapted for automobile torpedoes, and other devices, where certainty of continuous operation is paramount.

A further object of my invention is to provide a compound turbine in which the actuating medium is repeatedly directed through the rotor vanes by a series of jets of progressively increasing velocity; whereby an efficient distribution of pressure of the actuating medium will be insured and the losses incident to friction and regeneration of pressure of said medium will be minimized.

In the accompanying drawings, forming a part of this application and in which similar reference symbols indicate corresponding parts in the several views—Figure 1 is an axial sectional view, on the line 1—1, of Fig. 2, illustrating one embodiment of my invention; Fig. 2 is a sectional view on the line 2—2, of Fig. 1, clearly showing the arrangement of the annular series of admission ports; Fig. 3 is a sectional view on the line 3—3, of Fig. 1, showing the arrangement of the annular series of exhaust ports; Fig. 4 is a detail sectional view through the final exhaust port, on the line 4—4, of Fig. 2; Fig. 5 is a fragmentary perspective view of the rotor, showing a modified construction in which the vanes extend across said rotor with a slight rearward inclination; Fig. 6 is a perspective view of a portion of the port ring, clearly illustrating the arrangement of the admission ports; Fig. 7 is a perspective view of the port ring, showing the exhaust port side thereof; Fig. 8 is a development of the outer periphery of the port ring and the annular closure plates at each side thereof; and Fig. 9 is a similar development of the inner periphery of the port ring and closure plates.

Referring to the drawings, 1 indicates a turbine casing suitably secured, as by a series of bolts 2 to two casing heads 3; a port ring 4 and side closure rings 5 being supported within said casing and heads.

An annular series of substantially U-shaped vanes is clamped between two annular blocks 6, which latter are provided with coöperating recesses 7 corresponding to the outer contour of the vanes; a central division and clamping ring 8 extending around the annular series of vanes between the admission legs 9 and discharge legs 10 of the several vanes. The annular blocks 6 are preferably provided with relatively soft seats 6ª for permitting slight impression of the vanes therein when the parts are clamped together. Such seats can be advantageously provided by lining the recesses 7 with sheets of copper, or by electro-depositing copper, or other suitable metal, on the walls of said recesses.

Rotor disks 11, secured to the turbine shaft 12, carry an annular spacing member 13 whose outer periphery constitutes a seat for the annular blocks 6. The spacing member 13 and block 6 are clamped between the rotor disks 11 by a series of bolts 14; suitable means, such as bolts 15, being provided for preventing shifting of the rings 6.

The U-shaped reversing vanes comprise admission legs 9, of mainly kinetic type, and discharge legs 10, of mainly pressure type, connected by a portion 16 of increased width; as shown in Fig. 6, the rotor vanes can be extended across the rotor with a slight rearward inclination, thereby causing the entire length of the U-shaped vanes to constitute a continuous active vane. Such modification is advantageous in small sizes of motors, under certain conditions of operation. The increased width of the connecting portions 16 of the vanes produces a reduction of velocity and slight regeneration of pressure in the actuating medium during its deflection while passing from the admission legs to the discharge legs of the vanes; thereby minimizing the friction of the actuating medium during its deflection and efficiently augmenting the action of both the admission and discharge legs.

The port ring 4 is provided on its respective sides with a series of admission ports 17 to 23 and a corresponding series of discharge ports 24 to 30. The successive ports of each series are shown having a uniform depth, and a progressively increased peripheral width to accommodate the expansion of the actuating medium during its flow through the series. A series of recesses 31 to 36, extending angularly across the outer periphery of the port ring 4, constitute chambers connecting the outer ends of the several exhaust ports with the outer ends of the next succeeding admission ports. The several ports and their connecting chambers are suitably proportioned to produce a progressively increased velocity of the steam flow in the successive admission ports of the series; the velocity of the steam in the initial admission port being preferably made as low as practicable without causing a defective brake action of the steam in the early stages.

The angle at which each exhaust port is positioned in advance of the next receiving admission port depends upon the relation between the steam velocity and rotor speed, and the recesses, connecting the outer ends of the several exhaust ports with the outer ends of the next succeeding admission ports, extend across the port ring at an angle determined by said advance angle of the exhaust ports and by the peripheral dimensions of the successive ports of the series. With a constant relation between the steam velocity and rotor speed, the progressively increased peripheral dimension of the succeeding ports would necessitate an impracticably great angularity of the connecting recesses before an advantageous or efficient number of stages had been reached.

In the improved construction illustrated, the progressively increased velocity of the steam flow in the successive admission ports causes a progressive decrease in the advance angle of the several exhaust ports relative to the next preceding admission ports. This decrease in the advance angle of the successive exhaust ports enables the inner ends of the ports of the admission and exhaust series to be uniformly spaced in staggered relation along the periphery of the rotor vanes, without causing an impracticably great angularity of the chambers connecting the outer ends of the ports. Such staggered relation between the uniformly spaced ports of the admission and exhaust series causes a very uniform distribution of the driving force about the periphery of the rotor. With large diameters of rotors, several independent sets of such successive series of ports can be uniformly spaced about the periphery of the rotor; thereby multiplying the power and maintaining a uniform distribution of the driving force about the periphery of the rotor.

As shown especially in Fig. 9, the above described construction enables the inner ends of the several admission ports to extend past, or overlap the inner ends of the adjacent exhaust ports; thereby providing a continuous zone of ports along the periphery of the rotor, which minimizes distortion of the parts under the action of varying temperatures and permits the employment of efficiently small rotor clearance.

In the operation of my invention, the steam, or other actuating medium, is conducted by a main supply pipe 37 under suitable pressure to a steam chest 38. The initial admission port 17, leading from the steam chest 38, directs the steam at an efficient angle against the admission legs of the rotor vanes, from which it is deflected past the vane portion 16 to the corresponding discharge legs; a slight generation of the steam pressure being produced during its passage from the admission to the discharge legs. After thus following a substantially U-shaped path through the vanes, the steam is peripherally discharged into the first exhaust port 24, from which it is conducted by the recess 31 across the outer periphery of the port ring to the outer end of the next succeeding admission port 18. The admission port 18 directs the steam again through the rotor vanes, from which it is discharged into the next succeeding exhaust port 25. From the exhaust port 25, the steam is conducted perpendicularly across the outer periphery of the port ring, to the outer end of the next succeeding admission port 19; and the above described steps are repeated until the steam passes through the several successive ports of the series and is exhausted through the final discharge port 30. The turbine casing is shown provided with a discharge conduit 39 for leading the final exhaust from the port 30 to any suitable point, such as the atmosphere or a condenser.

From the above description, it will be seen that my invention provides a compact and simple form of compound turbine, having a uniform distribution of the driving force about the periphery of the rotor, free from the defects due to distortion of the parts under the action of varying temperatures, and in which the losses incident to friction and regeneration of pressure of the actuating medium are minimized.

I have illustrated and described a preferred and satisfactory form, but, obviously, changes could be made within the spirit and scope of my invention.

Having thus described my invention, what I claim as new and desire to secure by Letters Patent is:

1. In a compound turbine, the combination of a rotor, an annular series of vanes carried thereby, means for conducting an actuating medium in a helical path and for directing said medium with progressively increased velocity through said vanes at successive points along its path, substantially as described.

2. In a compound turbine, the combination of a rotor, an annular series of vanes carried thereby, and means for repeatedly directing an actuating medium against the outer periphery of said annular series of vanes in a successive series of jets of progressively increased velocity, substantially as described.

3. In a compound turbine, the combination of a rotor, an annular series of rotor vanes provided with admission and exhaust edges in the periphery of said rotor, a series of admission ports uniformly spaced about the periphery of the admission edges of said annular series of vanes, and a series of exhaust ports uniformly spaced about the periphery of the exhaust edges of said vanes, the successive ports of said series being formed with progressively increased peripheral dimensions and the successive exhaust ports arranged at a progressively decreased angle in advance of the next preceding admission ports, substantially as described.

4. In a turbine, a rotor comprising disks, annular blocks provided with coöperating recesses corresponding to the contour of the rotor vanes, an annular series of rotor vanes positioned in said coöperating recesses, and a common means for clamping together said disks, annular blocks, and vanes, substantially as described.

5. In a turbine, a rotor comprising disks, annular blocks provided with coöperating recesses, seats of relatively soft material in said coöperating recesses, an annular series of rotor vanes positioned on said seats, and means for clamping together said disks, annular blocks and vanes, and impressing said vanes in their relatively soft seats, substantially as described.

6. In a turbine, a rotor comprising disks, annular blocks provided with coöperating recesses corresponding to the contour of the rotor vanes, seats of relatively soft metal deposited on the surfaces of said recesses, an annular series of rotor vanes positioned in said coöperating recesses, and means for clamping together said disks, annular blocks and vanes, and impressing said vanes in their relatively soft seats, substantially as described.

7. In a turbine, a rotor comprising disks, a spacing member carried by said disks, recessed annular blocks seated on said spacing member, a series of vanes positioned in the recess of said annular blocks, and means engaging said disks for clamping therebetween said spacing member, annular blocks and vanes, substantially as described.

8. In a turbine, a rotor comprising disks, an annular spacing member carried by said disks, recessed annular blocks seated on the outer periphery of said spacing member, a series of vanes positioned in the recess of said annular blocks, and means engaging said disks for clamping therebetween said spacing member, annular blocks and vanes, substantially as described.

In testimony whereof I affix my signature in presence of two witnesses.

RICHARD H. GOLDSBOROUGH.

Witnesses:
G. AYRES,
H. A. ROBINETTE.